(12) United States Patent
Komura et al.

(10) Patent No.: US 6,820,438 B2
(45) Date of Patent: Nov. 23, 2004

(54) VEHICLE AIR CONDITIONER

(75) Inventors: Masato Komura, Kariya (JP); Koji Yamashita, Obu (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/744,649

(22) Filed: Dec. 23, 2003

(65) Prior Publication Data

US 2004/0134209 A1 Jul. 15, 2004

(30) Foreign Application Priority Data

Dec. 26, 2002 (JP) ........................................ 2002-376875

(51) Int. Cl.[7] .............................. B60H 1/32; F25B 27/00
(52) U.S. Cl. .............................. 62/236; 62/133; 62/243; 62/323.3; 62/323.4
(58) Field of Search ....................... 62/133, 236, 323.3, 62/323.4, 228.4, 228.5, 230, 243, 158, 244

(56) References Cited

U.S. PATENT DOCUMENTS

| | | | |
|---|---|---|---|
| 5,867,996 A | 2/1999 | Takano et al. | |
| 6,287,081 B1 * | 9/2001 | Tamegai et al. | 417/15 |
| 6,351,957 B2 * | 3/2002 | Hara | 62/133 |
| 6,367,270 B2 * | 4/2002 | Niimi et al. | 62/133 |
| 6,745,585 B2 * | 6/2004 | Kelm et al. | 62/236 |

* cited by examiner

Primary Examiner—Harry B. Tanner
(74) Attorney, Agent, or Firm—Harness, Dickey & Pierce, PLC

(57) ABSTRACT

In a vehicle air conditioner, a compressor is driven by a vehicle engine when an actual temperature of an evaporator is higher than a basis temperature that is higher than a target temperature by a predetermined temperature, and is driven by an electrical motor when the actual temperature of the evaporator is lower than the basis temperature. The predetermined temperature is set to be higher as the target temperature of the evaporator decreases such that the basis temperature is not higher than a comfortable limit temperature. Accordingly, the compressor can be driven by the electrical motor in a range where the actual temperature can be controlled to be not higher than the comfortable limit temperature. Therefore, fuel consumption efficiency of the engine can be improved, while a minimum of cooling capacity can be ensured.

7 Claims, 3 Drawing Sheets

VEHICLE AIR CONDITIONER

CROSS-REFERENCE TO RELATED APPLICATION

This application is related to and claims priority from Japanese Patent Application No. 2002-376875 filed on Dec. 26, 2002, the content of which is hereby incorporated by reference.

BACKGROUND OF THE INVENTION

1. Field of the Invention

The present invention relates to a vehicle air conditioner having a compressor, which is driven by a vehicle engine when a cooling load of a passenger compartment is higher than a predetermined value, and is driven by an electrical motor when the cooling load of the passenger compartment is lower than the predetermined value.

2. Description of Related Art

In a vehicle air conditioner described in U.S. Pat. No. 5,867,996 (corresponding to JP-A-10-236151), a variable displacement compressor is driven by a vehicle engine having a large output when a cooling load of a passenger compartment is larger than a predetermined value. Further, when the cooling load of the passenger compartment becomes lower than the predetermined value, the variable displacement compressor is driven by an electrical motor having an output smaller than that of the vehicle engine. However, according to experiments by the inventors of the present application, in a case where the cooling load is determined based on a deviation between an actual temperature of an evaporator and a target temperature of the evaporator, a necessary cooling capacity may be obtained even if the compressor is driven by the electrical motor when the cooling load is higher than the predetermined value. In this case, fuel consumption efficiency of the vehicle engine may be deteriorated.

SUMMARY OF THE INVENTION

In view of the above problem, it is an object of the present invention to improve fuel consumption efficiency of a vehicle engine while at least a minimum of necessary cooling capacity can be obtained, in a vehicle air conditioner having a compressor that is driven by the vehicle engine when the cooling load is higher than a predetermined value and is driven by an electrical motor when the cooling load is lower than the predetermined value.

According to a first aspect of the present invention, a vehicle air conditioner includes a compressor of a refrigerant cycle driven by at least one of an engine and an electrical motor for compressing refrigerant, and an evaporator for cooling air to be blown into a passenger compartment of the vehicle by performing a heat exchange between the air and low-pressure low-temperature refrigerant in the refrigerant cycle supplied by operation of the compressor, and an air-conditioning control unit for controlling the compressor. Further, the air-conditioning control unit includes a target temperature calculating means for calculating a target temperature of the evaporator to be lower as a cooling load in the passenger compartment becomes higher, a control means for controlling the compressor in such a manner that an actual temperature of the evaporator approaches to the target temperature, and a basis temperature setting means for setting a basis temperature that is higher than the target temperature by a predetermined temperature. When the actual temperature of the evaporator is higher than the basis temperature, the air-conditioning control unit outputs an engine drive signal for requiring a drive of the engine, and the compressor is operated by a driving force transmitted from the engine. On the other hand, when the actual temperature of the evaporator is lower than the basis temperature, the air-conditioning control unit prohibits an output of the engine drive signal and outputs a motor drive signal for requiring a drive of the electrical motor to drive the electrical motor, and the compressor is operated by a driving force from the electrical motor. In the air conditioner, the basis temperature setting means includes a predetermined temperature calculation means for calculating the predetermined temperature in accordance with the target temperature such that the predetermined temperature becomes higher as the target temperature becomes lower, and the basis temperature setting means sets the basis temperature to be not higher than a predetermined comfortable limit temperature. Accordingly, the fuel consumption efficiency of the engine can be effectively improved while a minimum of cooling capacity of the passenger compartment can be ensured.

For example, as the compressor, a variable displacement compressor capable of adjusting its displacement from an outside can be used. In this case, a temperature variation in the evaporator can be effectively reduced.

According to a second aspect of the present invention, in a vehicle air conditioner, when an actual temperature of the evaporator is higher than a predetermined comfortable limit temperature, the air-conditioning control unit outputs an engine drive signal for requiring a drive of the engine, and the compressor is operated by a driving force transmitted from the engine. On the other hand, when the actual temperature of the evaporator is lower than the predetermined comfortable limit temperature and is higher than a first basis temperature that is higher than a target temperature by a first predetermined temperature, the air-conditioning control unit prohibits an output of the engine drive signal and outputs a motor drive signal for requiring a drive of the electrical motor to drive the electrical motor, and the compressor is operated by a driving force transmitted from the electrical motor. Further, when the actual temperature of the evaporator is lower than the first basis temperature, the air-conditioning control unit prohibits the output of the engine drive signal and an output of the motor drive signal, and stops operation of the compressor. Accordingly, the fuel consumption efficiency of the engine effectively can be improved while at least the minimum of the cooling capacity of the passenger compartment can be obtained.

Specifically, the comfortable limit temperature is a highest temperature of a second basis temperature that is higher than the target temperature by a second predetermined temperature larger than the first predetermined temperature, and the air-conditioning control unit sets the second predetermined temperature to be higher as the target temperature becomes lower.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the appended drawings.

Figure 1:
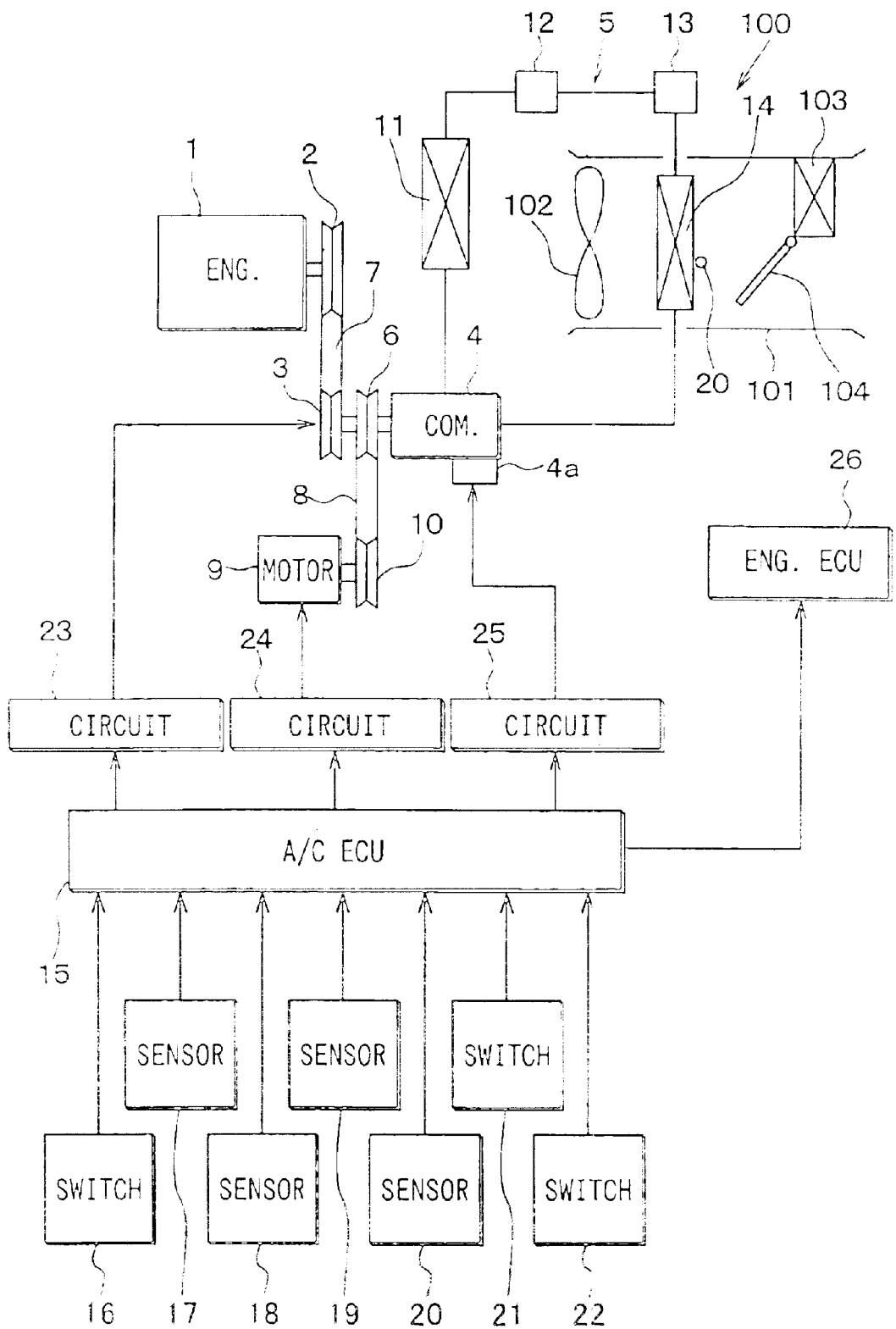
FIG. 1 is a schematic diagram showing a vehicle air conditioner according to a preferred embodiment of the present invention.

FIG. 1 shows a general structure of a vehicle air conditioner. In FIG. 1, a driving pulley 2 is provided on an output shaft of a vehicle engine 1 for running a vehicle, and is rotated to be operatively linked with an operation of the vehicle engine (E/G) 1.

A receiving pulley 6 is provided on a drive shaft of a compressor 4 that is a part of a vehicle refrigerant cycle 5. The receiving pulley 6 and a rotation shaft of a solenoid clutch 3 are arranged on the same axis. A belt 7 used as a motive-power transmitting member is hung on the driving pulley 2 and the solenoid clutch 3. In this way, when the solenoid clutch 3 is energized to be connected to the compressor 4 through the receiving pulley 6, the compressor 4 is driven and operated by the vehicle engine 1.

The compressor 4 can be driven not only by the vehicle engine 1, but also by an electrical motor 9 mounted on a vehicle. The electrical motor 9 is operated by receiving electric power from a vehicle battery (not shown). A driving pulley 10 is provided on an output shaft of the electrical motor 9. A belt 8 used as a motive-power transmitting member is hung on the driving pulley 10 and the receiving pulley 6. Thus, when the compressor 4 is driven by the electrical motor 9 while an operation of the vehicle engine 1 is stopped, the connection between the vehicle engine 1 and the compressor 4 is interrupted by de-energizing the solenoid clutch 3. Then, the compressor 4 is driven and operated by the electrical motor 9. The compressor 4 is constructed by a variable displacement compressor capable of changing its displacement (i.e., discharge capacity) from an outside. More specifically, a swash-plate variable displacement compressor having a solenoid control valve 4a can be used as the compressor 4. In the swash-plate variable displacement compressor, an angle of a swash plate is changed by controlling a pressure in a crank chamber (not shown), so that its displacement is changed.

The refrigerant cycle 5 includes the compressor 4, a condenser 11, a receiver 12, an expansion valve 13, an evaporator 14 and the like. The condenser 11 condenses and liquefies high-temperature high-pressure refrigerant compressed by and discharged from the compressor 4. The receiver 12 separates the condensed and liquefied refrigerant into gas refrigerant and liquid refrigerant. The expansion valve 13 decompresses and expands the separated liquid refrigerant flowing out of the receiver 12, and the evaporator 14 evaporates the expanded low-temperature low-pressure refrigerant from the expansion valve 13.

An air conditioning unit 100, for supplying conditioned air into a passenger compartment, includes an air conditioning case 101 for forming an air passage through which air flows into the passenger compartment. The air conditioning unit 101 includes a fan 102 for blowing air in the air passage of the air conditioning case 101, the evaporator 14, a heater core 103 and an air mixing door 104. The evaporator 14 is disposed in the air conditioning case 101 so that refrigerant in the evaporator 14 is evaporated by receiving heat from air in the air passage of the air conditioning case 101. Therefore, air passing through the evaporator 14 is cooled. The heat core 103 is disposed downstream of the evaporator 14 in the air conditioning case 101 to heat air passing therethrough by using engine-cooling water as a heating source. The air mixing door 14 is disposed to adjust an air amount passing through the heater core 103 and an air amount bypassing the heater core 103, so that conditioned air having a predetermined temperature can be obtained. Plural air outlets, from which conditioned air is blown to upper and lower half bodies of a passenger and an inner surface of a windshield in the passenger compartment, are provided in the air conditioning case 101 at a downstream air side of the heater core 103.

An air-conditioning control unit (air conditioning ECU, A/C ECU) 15 is a computer unit including a central processing unit (CPU), a read only memory (ROM), a random access memory (RAM) and the like. When an ignition switch 16 used as a vehicle running switch is turned on, electric power is supplied to the air conditioning ECU 15 from the vehicle battery (not shown). Signals are input to the air conditioning ECU 15 from an inside air temperature sensor 17, an outside air temperature sensor 18, a sunlight sensor 19, a post-evaporator air temperature sensor 20, a temperature setting device 21 (switch), an air conditioning switch 22 and the like. The inside air temperature sensor 17 detects an air temperature in the passenger compartment, and the outside air temperature sensor 18 detects an outside air temperature outside the passenger compartment. The sunlight sensor 19 detects a sunlight amount radiated into the passenger compartment, and the post-evaporator air temperature sensor 20 detects an air temperature (post-evaporator air temperature) TE immediately after passing through the evaporator 14. The temperature setting device 21 is used for setting a target air temperature in the passenger compartment, and the air conditioning switch 22 is used for introducing a start operation of the compressor 4.

The air conditioning ECU 15 performs a predetermined calculation process based on the input signals described above. Then, the air conditioning ECU 15 controls a clutch control circuit 23, a motor drive circuit 24 and a displacement control circuit 25. Specifically, the air conditioning ECU 15 controls an output (ON) or a non-output (OFF) of a clutch connection signal Scl to the clutch control circuit 23, so that the solenoid clutch 3 is energized, or de-energized. The air conditioning ECU 15 controls an output (ON) or a non-output (OFF) of a motor drive signal Smo to the motor drive circuit 24, so that operation of the electrical motor 9 is controlled. The air conditioning ECU 15 controls an output of a displacement control signal to the displacement control circuit 25, so that the solenoid control valve 4a is controlled. Further, the air conditioning ECU 15 controls an output (ON) or not-output (OFF) of an engine drive signal Sen to an engine ECU 26. For example, the engine ECU 26 inputs a signal from the air conditioning ECU 15 and vehicle-side requirement signals such as a vehicle speed signal, and controls the on-off operation of the vehicle engine 1.

Figure 2:
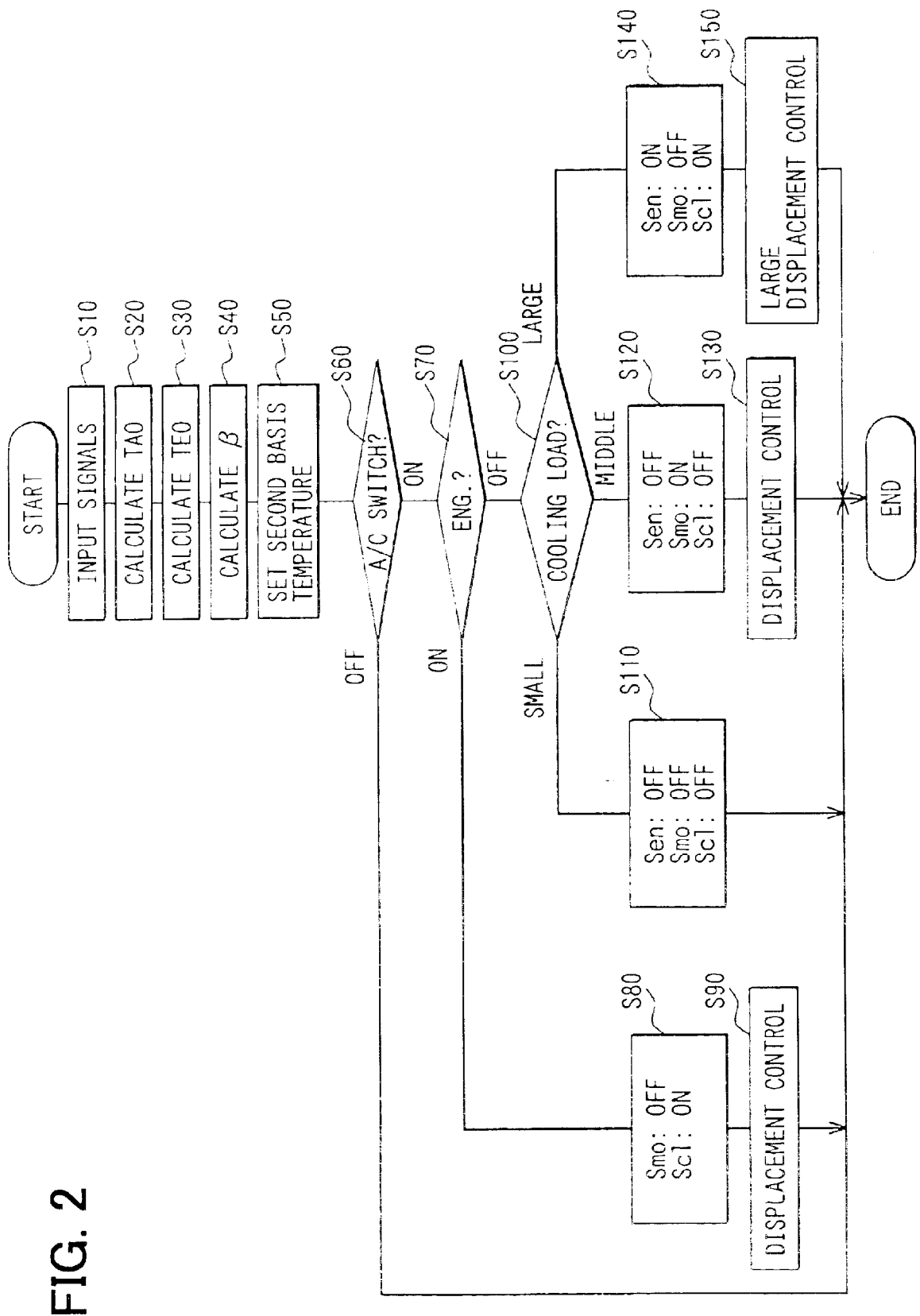
FIG. 2 is a flow diagram showing a control process performed by an air-conditioning control unit according to the preferred embodiment.

Next, a control process of the air conditioning ECU 15 will be described with reference to FIGS. 2–5. When the ignition switch 16 is turned on, the control routine shown in FIG. 2 is started. Then, at step S10, the signals from the sensors 17–20, the temperature setting device 21 and the air conditioning switch 22 are input to the air conditioning ECU 15. At step S20, a target air temperature TAO to be blown into the passenger compartment is calculated by using the following formula (1) based on the signals from the inside air temperature sensor 17, the outside air temperature sensor 18, the sunlight sensor 19 and the temperature setting device 21.

$$TAO = Kset \times Tset - Kr \times Tr - Kam \times Tam - Ks \times Ts - C \tag{1}$$

Wherein, Tset is a set temperature set by the temperature setting device 21, Tr is the air temperature in the passenger compartment detected by the inside air temperature sensor 17, Tam is the outside air temperature detected by the outside air temperature sensor 18, and Ts is the sunlight amount entering into the passenger compartment detected by the sunlight sensor 19. Further, Kset, Kr, Kam and Ks are coefficients of values corresponding to the signals, and C is a control constant. That is, a deviation between the set temperature Tset set by the temperature setting device 21 and the inside air temperature Tr detected by the inside air temperature sensor 17 is corrected by using a condition such as the outside air temperature Tam and the sunlight amount Ts, so that the target air temperature TAO can be obtained.

Figure 3:
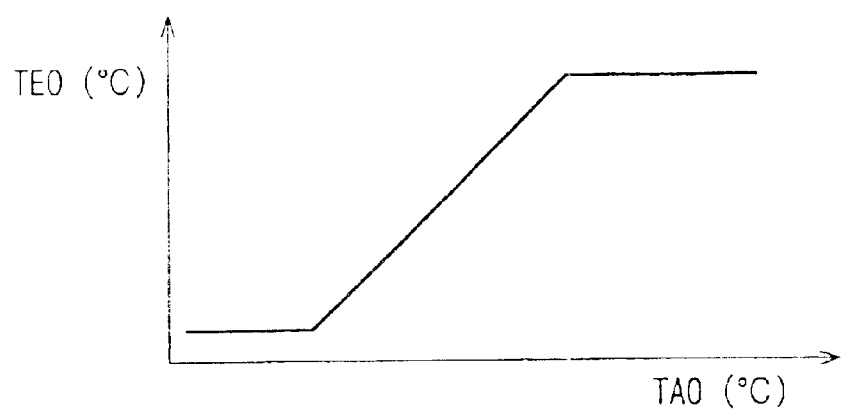
FIG. 3 is a graph showing a relationship between a target air temperature TAO and a target post-evaporator air temperature TEO, according to the preferred embodiment.

At step S30, a target post-evaporator air temperature TEO, which is a target temperature of the post-evaporator air temperature TE, is calculated by using the graph shown in FIG. 3 based on the target air temperature TAO calculated at step S20. Here, as shown by the graph in FIG. 3, the target post-evaporator air temperature TEO is set to be lower as the target air temperature TAO becomes lower. That is, the target post-evaporator air temperature TEO is set to be lower as the cooling load of the passenger compartment becomes higher.

Figure 4:
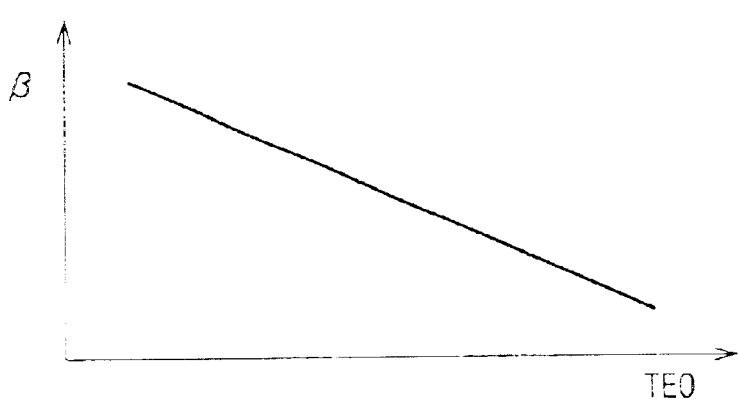
FIG. 4 is a graph showing a relationship between the target post-evaporator air temperature TEO and a second predetermined temperature β, according to the preferred embodiment.

At steps S40 and S50, a second basis temperature (described later), used as a basis temperature in the present invention, is set. Specifically, a second predetermined temperature β, used as a predetermined temperature in the present invention, is calculated at step S40 based on the graph in FIG. 4. As shown in FIG. 4, the second predetermined temperature β is set to be higher as the target post-evaporator air temperature TEO becomes lower.

Next, the second basis temperature is set at step S50. The second basis temperature is the sum of the target post-evaporator air temperature TEO and the second predetermined temperature β. Accordingly, at step S50, the sum of the target post-evaporator air temperature TEO and the second predetermined temperature β is calculated, and is set as the second basis temperature. In this embodiment, the second predetermined temperature β is set so that the second basis temperature is not higher than a comfortable limit temperature (e.g., 15° C.) in an entire using area of the target post-evaporator air temperature TEO. When the second basis temperature is equal to or lower than the comfortable limit temperature, at least a minimum of necessary cooling capacity can be obtained.

At step S60, it is determined whether or not the air conditioning switch 22 is turned on. When the air conditioning switch 22 is in a turning off state, the compressor 4 is not required to be driven. In this case, the control routine is returned to the starting state of the air conditioning ECU 15 without performing any control process.

When the air conditioning switch 22 is in a turning on state, it is determined at step S70 whether or not the vehicle engine 1 is in a driving state, based on the vehicle-side requirement signal such as the vehicle speed signal. When it is determined based on the vehicle-side requirement signal that the vehicle engine 1 is in the driving state, the compressor 4 can be driven by motive power from the vehicle engine 1. Therefore, at step S80, the motor drive signal Smo is not output (OFF), but the clutch connection signal Scl is output (ON). In this way, the operation of the electrical motor 9 is stopped, but the solenoid clutch 3 is energized so that the vehicle engine 1 and the compressor 4 are connected to each other. Accordingly, the compressor 4 can be operated by the vehicle engine 1 while the vehicle engine 1 operates.

At step S90, the displacement of the compressor 4 is controlled so that the post-evaporator air temperature TE detected by the post-evaporator air temperature sensor 20 becomes the target post-evaporator air temperature TEO. The displacement of the compressor 4 can be controlled based on a cooling load of the evaporator 14, that is, a cooling load of the passenger compartment. For example, the cooling load of the evaporator 14 is the deviation between the post-evaporator air temperature TE detected by the post-evaporator air temperature sensor 20 and the target post-evaporator air temperature TEO. Thereafter, the control routine is returned to the starting state.

Figure 5:
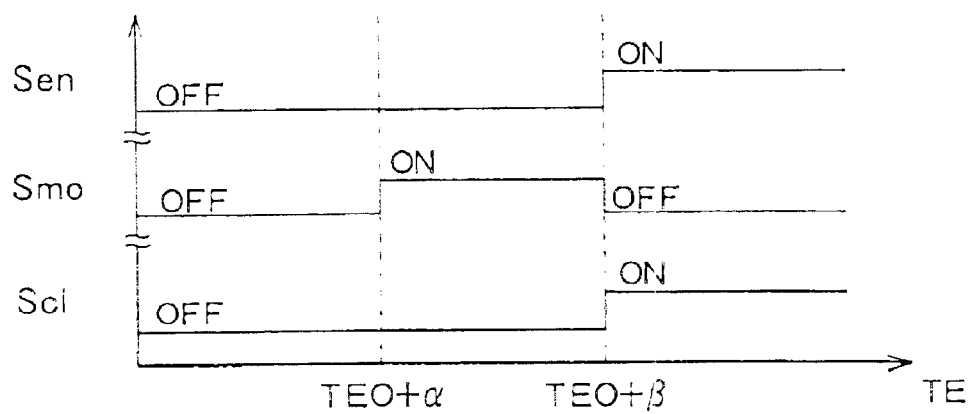
FIG. 5 is a graph showing a relationship between a post-evaporator air temperature TE, and output states (ON-OFF states) of an engine drive signal Sen, a motor drive signal Smo and a clutch connection signal Scl, according to the preferred embodiment.

On the other hand, it is determined at step S70 that the vehicle engine 1 is not in a driving state based on the vehicle-side requirement signal, the compressor 4 is controlled at steps S100–S150 in accordance with the cooling load. That is, the operation state of the compressor 4 is controlled, and the driving source of the compressor 4 and the displacement of the compressor 4 are controlled, in accordance with the cooling load. Specifically, at step S100, the cooling load is determined based on a first basis temperature (TEO+α) stored in the ROM, the second basis temperature (TEO+β) set at step S50 and the post-evaporator air temperature TE. Here, α<β. When the post-evaporator air temperature TE is lower than the first basis temperature (TEO+α), it is determined that the cooling load is small, so the compressor 4 is not required to be driven. Therefore, in this case, at step S110, the engine drive signal Sen, the motor drive signal Smo and the clutch connection signal Scl are not output (OFF), as shown in FIG. 5. In this way, the vehicle engine 1 is not operated, the electrical motor 9 is not operated, and the solenoid clutch 3 is de-energized. That is, in this case, the engine stop state determined at step S70 is maintained.

When the post-evaporator air temperature TE is higher than the first basis temperature (TEO+α) and lower than the second basis temperature (TEO+β), it is determined that the cooling load is middle (i.e., intermediate level). In this case, at step S120, the engine drive signal Sen and the clutch connection signal Scl are not output (OFF), but the motor drive signal Smo is output (ON), as shown in FIG. 5. That is, the air conditioning ECU 15 prohibits an output of the engine drive signal Sen and an output of the clutch connection signal Scl. Accordingly, the vehicle engine 1 is not operated, the solenoid clutch 3 is de-energized, and the electrical motor 9 is driven. Then, at step S130, the displacement of the compressor 4 is controlled. In this embodiment, because the output capacity of the electrical motor 8 for driving the compressor 4 is not so large, the displacement of the compressor 4 cannot be controlled to be large. Accordingly, when the cooling load is the middle (i.e., the intermediate level), the compressor 4 is controlled at a predetermined intermediate displacement, for example, at 40% of its maximum displacement. Thereafter, the control routine is returned to the starting state. Here, when the electrical motor 9 has a large output capacity, the displacement of the compressor 4 can be controlled in accordance with the cooling load.

When the post-evaporator air temperature TE is higher than the second basis temperature (TEO+β), the cooling load is determined to be large at step S100, and the control routine proceeds to step S140. At step S140, the engine drive signal Sen and the clutch connection signal Scl are output (ON), but the motor drive signal Smo is not output (OFF), as shown in FIG. 5. In this way, the vehicle engine 1 is driven, the solenoid clutch 3 is energized, and the electrical motor 9 stops.

At step S150, the displacement of the compressor 4 is controlled so that the post-evaporator air temperature TE detected by the post-evaporator temperature sensor 20 becomes the target post-evaporator air temperature TEO.

As described above, in this embodiment, the second predetermined temperature β is calculated to be lower as the target post-evaporator air temperature TEO increases, so that the second basis temperature is not higher than the comfortable limit temperature in the entire using area of the target post-evaporator air temperature TEO. Therefore, even in a case where the cooling load of the passenger compartment is high, the compressor 4 can be driven by the electrical motor 9 while the post-evaporator air temperature TE is restricted to be not higher than the comfortable limit temperature. Accordingly, the fuel consumption efficiency of the vehicle engine 1 can be effectively improved. Further, because the second predetermined temperature β larger than the first predetermined temperature α is set in accordance with the graph of FIG. 4 based on the target post-evaporator air temperature TEO, the second basis temperature (TEO+β) that is the sum of the target post-evaporator air temperature TEO and the second predetermined temperature β can be readily set.

If the second predetermined temperature β is set at a constant value without being changed in accordance with the target post-evaporator air temperature TEO, the fuel consumption efficiency cannot be effectively improved by the following reason. For example, when an actual evaporator temperature (corresponding to the actual post-evaporator air temperature TE) is 10° C., a target evaporator temperature (corresponding to the target post-evaporator air temperature TEO) is 2° C. and the second predetermined temperature is set at a constant temperature of 5° C., the second basis temperature is 7° C. (i.e., 2° C.+5° C.). In this comparison example, because the actual post-evaporator air temperature TE (10° C.) is higher than the second basis temperature (7° C.), it can be determined that the cooling load becomes higher than the predetermined value, and the compressor 4 is driven by the vehicle engine 1. However, according to experiments by the inventors of the present application, it is determined that an uncomfortable feeling is difficult to be given to a passenger in the passenger compartment when the actual evaporator temperature does not becomes higher than the comfortable limit temperature (e.g., 15° C.). In the above-described comparison example, because the actual evaporator temperature is 10° C., it is difficult to give an uncomfortable feeling to the passenger in the passenger compartment. Therefore, in this case, a necessary cooling capacity can be sufficiently obtained only when the compressor 4 is operated by the electrical motor 9 without being operated by the vehicle engine 1. Therefore, in the above-described comparison example, the fuel consumption efficiency of the vehicle engine 1 cannot be sufficiently improved.

However, according to the present invention, the second predetermined temperature β is calculated to be higher as the target evaporator temperature (e.g., TEO) decreases, and the second basis temperature (TEO+β) is set to be not higher than the comfortable limit temperature in the entire using area of the target evaporator temperature (TEO). Accordingly, even when the evaporator target temperature (TEO) is low, the second basis temperature (TEO+β) can be set about to be constant regardless of the target evaporator temperature (TEO), while being set to be equal to or lower than the comfortable limit temperature. As a result, even when the cooling load in the passenger compartment is higher, the compressor 4 can be driven by the electrical motor 9 in a range where the actual post-evaporator air temperature (actual evaporator temperature) TE is not higher than the comfortable limit temperature. Therefore, the fuel consumption efficiency of the vehicle engine 1 can be effectively improved while at least the minimum of the necessary cooling capacity of the evaporator 14 can be ensured.

Further, according to this embodiment of the present invention, when the post-evaporator air temperature TE becomes higher than the second basis temperature, because the compressor 4 is driven by the vehicle engine 1 having the large output capacity, the displacement (discharge capacity) of the compressor 4 can be controlled in accordance with the cooling load or can be set at a large value. Accordingly, the cooling capacity can be increased, and at least the minimum of the necessary cooling capacity can be ensured.

In this embodiment of the present invention, when the compressor 4 is driven by the vehicle engine 1, the discharge capacity of the compressor 4 is controlled so that the post-evaporator air temperature TE becomes the target post-evaporator air temperature TEO. Therefore, a temperature variation in the evaporator 14 can be restricted as compared with a case where the temperature of the evaporator 14 is controlled by on-off control of the compressor 4.

Although the present invention has been fully described in connection with the preferred embodiment thereof with reference to the accompanying drawings, it is to be noted that various changes and modifications will become apparent to those skilled in the art.

For example, in the above-described embodiment, at step S40, the second predetermined temperature β is calculated so that the sum (TEO+β) of the target post-evaporator air temperature TEO and the second predetermined temperature β is not higher than the comfortable limit temperature (e.g., 15° C.) in the entire area of the target post-evaporator air temperature TEO. However, at step S40, the second predetermined temperature β can be calculated so that there is an area where the sum (TEO+β) of the target post-evaporator air temperature TEO and the second predetermined temperature β is higher than the comfortable limit temperature (e.g., 15° C.). In this case, the second basis temperature can be forcibly set at the comfortable limit temperature at step S50.

In the above-described embodiment of the present invention, as the temperature of the evaporator 14, the post-evaporator air temperature TE immediately after passing through the evaporator 14 is used. However, as the temperature of the evaporator 14, its own temperature of the evaporator 14 can be used. Further, the temperature of the evaporator 14 can be estimated based on the temperature or pressure of refrigerant at a low-pressure side in the refrigerant cycle.

In the above-described embodiment, the solenoid clutch 3 is provided between the vehicle engine 1 and the compressor 4. Further, the solenoid clutch 3 is energized when the compressor 4 is driven by the vehicle engine 1, and is de-energized when the compressor 4 is driven by the electrical motor 9. However, the solenoid clutch 3 may be eliminated. In this case, for example, the motive power of the vehicle engine 1 is always transmitted to the compressor 4 while the electrical motor 9 is connected to the compressor 4 through a one-way clutch. When the compressor 4 is driven by the vehicle engine 1, the operation of the electrical motor 9 can be stopped through the one-way clutch. The compressor 9 can be driven by the electrical motor 9 through the one-way clutch. In this case, when the operation of the compressor 4 is stopped, the compressor 4 is controlled at a minimum displacement to be substantially stopped.

Such changes and modifications are to be understood as being within the scope of the present invention as defined by the appended claims.

What is claimed is:

1. An air conditioner for a vehicle having an engine for running the vehicle, the air conditioner comprising:

a refrigerant cycle including
        a compressor, driven by at least one of the engine and an electrical motor, for compressing refrigerant, and
        an evaporator for cooling air to be blown into a passenger compartment of the vehicle by performing a heat exchange between the air and low-pressure low-temperature refrigerant in the refrigerant cycle supplied by operation of the compressor; and
    an air-conditioning control unit for controlling the compressor, wherein:
    the air-conditioning control unit includes
        a target temperature calculating means for calculating a target temperature of the evaporator to be lower as a cooling load in the passenger compartment becomes higher,
        a control means for controlling the compressor in such a manner that an actual temperature of the evaporator approaches to the target temperature, and
        a basis temperature setting means for setting a basis temperature that is higher than the target temperature by a predetermined temperature;
    when the actual temperature of the evaporator is higher than the basis temperature, the air-conditioning control unit outputs an engine drive signal for requiring a drive of the engine, and the compressor is operated by a driving force transmitted from the engine;
    when the actual temperature of the evaporator is lower than the basis temperature, the air-conditioning control unit prohibits an output of the engine drive signal and outputs a motor drive signal for requiring a drive of the electrical motor to drive the electrical motor, and the compressor is operated by a driving force from the electrical motor;
    the basis temperature setting means includes a predetermined temperature calculation means for calculating the predetermined temperature in accordance with the target temperature such that the predetermined temperature becomes higher as the target temperature becomes lower; and
    the basis temperature setting means sets the basis temperature to be not higher than a predetermined comfortable limit temperature.

2. The air conditioner according to claim 1, wherein the basis temperature setting means sets the basis temperature to be not higher than the predetermined comfortable limit temperature, by calculating the predetermined temperature by the predetermined temperature calculation means such that the sum of the target temperature and the predetermined temperature is not higher than the predetermined comfortable limit temperature in an entire area of the target temperature.

3. The air conditioner according to claim 1, wherein:

the compressor is a variable displacement compressor capable of adjusting its displacement from an outside; and
    the control means controls the displacement of the compressor based on the cooling load.

4. The air conditioner according to claim 1, wherein the predetermined comfortable limit temperature is set for obtaining at least a minimum of necessary cooling capacity in the passenger compartment.

5. An air conditioner for a vehicle having an engine for running the vehicle, the air conditioner comprising:

a refrigerant cycle including
        a compressor, driven by at least one of the engine and an electrical motor, for compressing refrigerant, and
        an evaporator for cooling air to be blown into a passenger compartment of the vehicle by performing a heat exchange between the air and low-pressure low-temperature refrigerant in the refrigerant cycle supplied by operation of the compressor; and
    an air-conditioning control unit for controlling the compressor, wherein:
    when an actual temperature of the evaporator is higher than a predetermined comfortable limit temperature, the air-conditioning control unit outputs an engine drive signal for requiring a drive of the engine, and the compressor is operated by a driving force transmitted from the engine;
    when the actual temperature of the evaporator is lower than the predetermined comfortable limit temperature and is higher than a first basis temperature that is higher than a target temperature by a first predetermined temperature, the air-conditioning control unit prohibits an output of the engine drive signal and outputs a motor drive signal for requiring a drive of the electrical motor to drive the electrical motor, and the compressor is operated by a driving force transmitted from the electrical motor; and
    when the actual temperature of the evaporator is lower than the first basis temperature, the air-conditioning control unit prohibits the output of the engine drive signal and an output of the motor drive signal, and stops operation of the compressor.

6. The air conditioner according to claim 5, wherein:

the comfortable limit temperature is a highest temperature of a second basis temperature that is higher than the target temperature by a second predetermined temperature larger than the first predetermined temperature; and
    the air-conditioning control unit sets the second predetermined temperature to be higher as the target temperature becomes lower.

7. The air conditioner according to claim 6, wherein:

when the actual temperature of the evaporator is lower than the second predetermined temperature and is higher than the first predetermined temperature, the compressor is operated by the driving force transmitted from the electrical motor.

* * * * *